(12) United States Patent
Teusch (10) Patent No.: US 9,649,696 B2
(45) Date of Patent: May 16, 2017

(54) CHUCK

(71) Applicant: GUEHRING OHG, Albstadt (DE)

(72) Inventor: Bruno Teusch, Esslingen (DE)

(73) Assignee: Guehring OHG, Albstadt (DE)

( * ) Notice: Subject to any disclaimer, the term of this patent is extended or adjusted under 35 U.S.C. 154(b) by 549 days.

(21) Appl. No.: 13/859,146

(22) Filed: Apr. 9, 2013

(65) Prior Publication Data

US 2013/0300071 A1 Nov. 14, 2013

(30) Foreign Application Priority Data

Apr. 13, 2012 (DE) .................. 10 2012 206 069
Aug. 23, 2012 (DE) .................. 10 2012 215 039

(51) Int. Cl.
| | |
|---|---|
| *B23B 31/02* | (2006.01) |
| *B23B 31/00* | (2006.01) |
| *B23B 31/08* | (2006.01) |
| *B23Q 11/10* | (2006.01) |

(52) U.S. Cl.
CPC .......... *B23B 31/028* (2013.01); *B23B 31/008* (2013.01); *B23B 31/083* (2013.01); *B23B 2231/54* (2013.01); *B23B 2250/12* (2013.01); *B23Q 11/1023* (2013.01); *Y10T 279/17* (2015.01); *Y10T 279/17111* (2015.01); *Y10T 279/3487* (2015.01)

(58) Field of Classification Search
CPC ... B23B 31/008; B23B 31/028; B23B 31/083; B23B 2250/12; B23Q 11/1023; Y10T 279/17111; Y10T 279/3487
USPC ........................... 279/20, 9.1, 156
See application file for complete search history.

(56) References Cited

U.S. PATENT DOCUMENTS

| | | | | |
|---|---|---|---|---|
| 3,806,973 A | * | 4/1974 | Hopkins ................. | 470/96 |
| 5,076,740 A | * | 12/1991 | Petrie ..................... | 408/59 |
| 5,213,453 A | * | 5/1993 | Eriksson ................. | 408/57 |
| 5,915,892 A | * | 6/1999 | Glimpel et al. ......... | 408/141 |
| 6,135,679 A | * | 10/2000 | Kazda ..................... | 408/57 |

(Continued)

FOREIGN PATENT DOCUMENTS

| | | | |
|---|---|---|---|
| DE | 3902559 A1 | * | 8/1990 |
| EP | 333923 A2 | * | 9/1989 |

OTHER PUBLICATIONS

Machine English translations of EP 333923A2 by Watzke et al. "Quick change chuck, specially for cutting internal- and external threads." Sep. 1989.*

*Primary Examiner* — Eric A Gates
*Assistant Examiner* — Chwen-Wei Su
(74) *Attorney, Agent, or Firm* — Burr & Brown, PLLC (57) ABSTRACT

The invention relates to tool mount with a base body and a receptacle that is joined with the base body for torque transmission and anchored in the base body in an axially movable manner with a spring preload. The base body exhibits a shank section with a recess that is open on the machine tool side, and a bushing section that axially lengthens the shank section, with a guide borehole that is open on the tool side and separated from the recess of the shank section by a radial dividing wall. The receptacle exhibits a guide section that is guided in the guide borehole of the bushing section in an axially movable manner. The receptacle is anchored by means of an anchor that passes through an axial opening in the radial dividing wall and can be actuated for setting the spring preload via the recess of the base body.

28 Claims, 3 Drawing Sheets

(56) References Cited

U.S. PATENT DOCUMENTS

2003/0103819 A1* 6/2003 Sugata et al. .................. 408/57
2005/0025585 A1* 2/2005 Weigel .......................... 408/1 R

* cited by examiner

CHUCK

The invention relates to a tool mount, in particular for a thread-generating tool, with a base body and a receptacle that is joined with the base body for torque transmission and anchored in the base body in an axially movable manner with a spring preload.

The main area of application for such tool mounts, which are also known as synchro chucks, length compensating chucks or the like, involves generating threads, in particular tapping or thread molding. Synchronizing the spindle advance and speed allows modern numerically controlled machine tools to essentially manufacture threaded holes without such tool mounts (e.g., see DE 102010009349 A1). However, it was demonstrated that synchronization errors can still be encountered, in particular during the required change in rotational direction upon reaching the maximum thread depth. Given a tool mount without axial length compensation, these errors can lead to axial and radial stresses, posing disadvantages with respect to thread-generating tool service life and thread quality.

Tool mounts with length compensation are used to offset synchronization errors between the spindle advance and pitch of the thread to be fabricated. The tool mount only exerts an axial force on the clamped thread-generating tool at the start of the thread-generating process. As soon as the thread has been cut, essentially only the rotational movement of the machine spindle is conveyed to the thread-generating tool, since the thread-generating tool is then automatically drawn into the cored hole via the cut thread. Therefore, the spindle advance need then only be coarsely regulated to such an extent that the tool mount does not reach its possible length compensating limit.

One example for such a tool mount (jaw chuck) with length compensation is shown and described in DE 10147581 C1. The tool mount has a coupling part (base body) that can be placed in a machine tool, as well as a spring-loaded tool holder (receptacle) that can be displaced in an axial direction relative to the coupling part. The tool holder is arranged coaxially to the coupling part, and exhibits a dowel hole that is centrally located, and hence also runs coaxially to the coupling part, and is open on the side facing away from the coupling part for inserting the shank (not shown in any greater detail) of a replaceable tool, for example a drill or milling cutter. The end region of the tool holder facing the coupling part is arranged in a central borehole of the coupling part. The tool holder is situated in this borehole so that it can be displaced relative to the coupling part in an axial direction, both toward the coupling part and away from the coupling part. The central borehole is stepped in an axial direction, and exhibits an outer region and inner region, wherein the diameter of the outer region is somewhat larger than the diameter of the inner region. A ball lining is placed in the outer region to establish a snug fit for the cylindrical end region of the tool holder. The ball lining is secured against twisting in the circumferential direction by a retaining element. The retaining element is placed in the coupling part, and extends in a radial direction, inwardly from the outer circumference of the coupling part, passes through the ball lining, and engages into an axially running groove in the circumferential area of an end region of the tool holder. By doing so, the retaining element acts as a torque driver between the coupling part and tool holder. Viewed in an axial direction, the ball lining is situated between a radial stage between the outer region and inner region of the central borehole and a threaded ring screwed onto the tool-side end section of the coupling part. Provided in the inner region of the central borehole are two compression springs that exert pressure in an axial direction. One end of one compression spring abuts against a face of the snug fit pointing away from the free end of the tool holder, while the other end abuts against a lateral surface of an annular flange attachment piece extending radially outward from the end region pointing toward the free end of the tool holder. One end of the other compression spring abuts against the opposing lateral surface of the annular flange attachment piece, and the other end abuts against a radially extending interior wall of the central borehole. Both compression springs are equally strong in design, so that, viewed in an axial direction, the annular flange attachment piece is situated in roughly the middle of the inner region in a resting position. Further provided in the tool holder is a centrally arranged and continuous coolant borehole for interior cooling, e.g., with water or oil.

A tool mount with a functionally similar structural design is shown and described in EP 1693134 A2. In particular, EP 1693134 A2 discloses a tool mount in the form of a collet chuck for holding a thread-cutting tool, consisting of an outer body (base body) with an axial borehole, which is open on the tool side, and incorporates an interior bushing (receptacle) that enables axial length compensation. The outside of the bushing that enables length compensation accommodates a collar, which is supported on the one side by an elastic material against a shoulder of the borehole of the outer body, so that the feed force exerted by a spindle driving the outer body can be conveyed to the bushing collar by way of the outer body and elastic material. On the other side, the bushing collar is supported by way of a spring against a threaded ring, which is screwed into a female thread section of the borehole of the outer body that can be accessed from the tool side. The spring allows the bushing guided in the threaded ring and borehole of the outer body to back axially out of the outer body against the restoring force exerted by the spring, until a radial shoulder of the bushing hits the threaded ring. The torque is transmitted from the outer body to the bushing via a polygonal mating surface, specifically a hexagonal circumferential surface, from the outer body to the bushing by way of the glued-in threaded ring. Also provided is a central lubricating coolant borehole that passes axially through the collet chuck, and can be used to supply lubricating coolant to a thread-cutting tool accommodated in the bushing.

DE 2001007 A1 discloses a tool mount in the form of a thread-cutting quick-change chuck with a shank (base body) and a chuck body (receptacle) arranged on the shank in an axially movable manner. Secured one behind the other to a spring center bolt rigidly connected with the axially movable chuck body are two preloaded compression springs, whose ends facing away from each other are supported against a respective locating surface at the beginning and end of the portion of the spring center bolt protruding from the chuck body, while the spring ends facing each other exhibit their support surfaces on a latch rigidly fastened with the interior of the chuck shank on the one hand, and on a second latch rigidly fastened with spring center bolt on the other. During exposure to compressive stress, the lower compression spring is pressed against the latch fastened with the chuck shank by the locating surface of the chuck body at the lower end of the spring center bolt, whereas the preloaded upper compression spring remains unchanged in terms of its position between the locating surface at the upper end of the spring center bolt and the latch on the spring center bolt. During exposure to a tensile stress, the upper compression spring is pressed against the latch fastened with the chuck shank by the locating surface at the upper end of the spring center bolt, whereas the preloaded lower compression spring remains unchanged in terms of its position between the locating surface at the lower end of the spring center bolt and the latch on the spring center bolt. Because the latch on the spring center bolt is as strong as the latch in the chuck shank, the two spring ends are pressed against the latch in the chuck shank with the length compensation feature not exposed to stress, and press the latch on the spring center bolt plane-parallel to the latch in the chuck shank. This ensures that the axial play is completely eliminated. By using two compression springs with different lengths or different wire diameters, the pressure for exposure to compressive and tensile stress can varyingly adjusted.

Known from EP 1090704 A1 or EP 0887135 A1 is a tool mount in the form of a hydraulic expansion chuck or thread-cutting chuck, in which a receiving section is arranged between a clamping device, in particular a collet chuck (receptacle) for a tap drill, and a chuck shank (base body), held without play in the rotational direction in the chuck shank, and exhibits a slight axial play spring-cushioned by elastomer compounds axially in the tensile and compression direction. The torque is to be entrained between the chuck shank and receiving section without play by means of torque entrainers in the form of cap screws, whose caps radially projecting over the receiving section engage into cross boreholes of the chuck shank with a slight axial play, or alternatively by means of entraining balls that join the chuck shank with the receiving section free of play in the rotational direction. The slight axial play is cushioned either by means of elastomer compounds, which fill the boreholes in the chuck shank and expanded connecting blind holes of the receiving section, or radially protruding pins that engage without play into the receiving section, and exhibit pinned elastomer rings projecting without play into boreholes of the chuck body.

In the latter case, the elastomer rings resting in the boreholes of the chuck body can be composed of two halves divided transverse to the longitudinal directions of the chuck, which each are made out of different materials with varying spring characteristics. In addition, the receiving section can be supported against the floor of the chuck shank by way of a rubber ring.

DE 19841537 A1 shows and describes a functionally similar tool mount as EP 1090704 A1 or EP 0887135 A1.

DE 4106468 A1 further shows and describes a tool mount in the form of a tool holder with holder sections on the machine side and tool side, which are joined together in a torque-proof and axially displaceable manner, and with a spring arranged between the holder sections for length compensation relative to compressive stress. The spring exhibits two spring segments varying in hardness, which act on a shared, axially displaceable bearing piece, wherein the hard spring segment acts on the tool-side holder section, and the soft spring segment acts on the machine-side holder section. Situated between the machine-side holder section and bearing piece is a blocking arrangement that can be detached as a function of pressure. The spring segments and bearing piece are arranged on a shared axial bolt, which is attached to one of the holder sections, and engages into a borehole of the other holder section. At least the hard spring segment consists of at least one essentially massive element made out of resilient plastic.

Finally known from DE 3829800 A1 is a tool mount in the form of a tool holder consisting of two holder sections coupled together in torque-proof manner so as to be longitudinally displaceable by an entraining device, between which is situated a spring arrangement that ensures length compensation relative to tensile and compressive stress. In particular, the spring arrangement encompasses a compression spring for length compensation relative to compressive stress, and another compression spring for length compensation relative to tensile stress. Both compression springs consist of a packet of elements made out of foamed, mixed-cell polyurethane elastomers. Specifically, the compression spring consists of two elements, while the compression spring encompasses four elements, and is correspondingly softer. The two compression springs are enveloped by a housing, which is glued into the machine-side holder section, and with its floor and a screwed cover forms stops for the two compression springs. The elements are pinned to a rod, which is screwed to the tool-side holder section, and extends through the housing. In addition, a disc-shaped actuator for the two compression springs is arranged on the rod between the two springs.

The tool mounts discussed above share in common that the torque is positively transmitted between the base body driven on the machine tool side and the receptacle that holds the thread-generating tool to be driven by means of radially acting entrainers (such as bolts, balls, clamping bolts, radial bolts with and without rollers, or the like) or by means of a polygonal circumferential mating surface between the base body and receptacle. In particular in the case of the radially acting entrainers, the torque transmission capacity is limited by the relatively narrow distance between the location where the entrainer(s) engage(s) into the base body and receptacle or vice versa and the rotational axis, and/or by the engaging site, which is locally narrowly limited in the circumferential direction. These radially acting entrainers or circumferential surface positive connections also yield a rigid connection between the base body and receptacle in the torsional or rotational direction. In addition, these tool mounts are put together in such a way as to basically no longer allow any engagement at least in the assembled state (with or without the thread-generating tool clamped in the receptacle), or configured for an engagement that induces a change or adjustment of the spring characteristic or spring travel of the receptacle relative to the base body. In the tool mounts discussed above, the spring characteristic or spring travel can only be modified or adjusted by using the corresponding spring arrangements or elements.

Proceeding from the prior art discussed above, the object of the invention is to create a tool mount, in particular for a thread-generating tool, which is characterized by a structurally simple design, and enables a simple adjustment of a spring preload between the base body and receptacle, along with an improved torque entrainment between the base body and receptacle.

This object is achieved by a tool mount with the features in claim 1. Advantageous further developments are the subject of dependent claims and/or will be discussed below.

The subject matter of the invention relates to a tool mount with a base body and a receptacle that is joined with the base body for torque transmission (in a torque-proof or torsionally elastic manner) and anchored in the base body in an axially movable (axially elastic) manner with a spring preload for purposes of axial length compensation. The base body and receptacle are replaceably connected with each other. The primary area of application for the tool mount according to the invention involves generating threads, in particular through tapping or thread molding. However, use of the tool mount according to the invention is not limited to generating threads. It is basically suitable for drilling operations in which an axial length compensation may be logical or useful, e.g., for generating boreholes with a spiral profile or in machining operations involving friction.

For this reason, the tool mount according to the invention is not limited to specific embodiments. A tool mount according to the invention can be designed as a hydraulic expansion chuck, shrink chuck or synchro threaded bushing, or as a collet chuck mount or parallel shank mount. Such tool mounts are known in the art. They hold and clamp a tool, for example a thread-generating tool, concentrically to the rotational axis. A tool mount according to the invention can further be designed as a quick-change chuck for accommodating a quick-change holder fitted with a tool. Regardless of the specific design, the tool mount according to the invention can comprise part of a modular tool system, for example of the kind shown and described in product catalogue no. 40 of the applicant, 2006 issue, in the system overview from pages 1358 to 1362.

In a broader sense, however, a tool mount according to the invention can also be designed as a multi-station die, e.g., a multi-stage miller, drill or reamer, which accommodates one or more disposable or replaceable cutting inserts. In this case, a tool mount according to the invention can exhibit a base body fitted with one or more cutting inserts, which is designed for machining a larger bore diameter, and a receptacle fitted with one or more cutting inserts, which is designed for machining a smaller bore diameter.

The base body of the tool mount according to the invention is used for (directly or indirectly) coupling the tool mount according to the invention to a machine tool spindle. To this end, the shank section of the base body can be designed like a known HSK (hollow shank taper), SK (steep taper), MK (Morse taper) or cylinder shank. The shank section has a preferably central recess that is open on the machine tool side, e.g., a borehole. A bushing section with a preferably central guide borehole that is open on the tool side adjoins the shank section in an axial direction. The guide borehole is separated from the recess in the shank section by a radial dividing wall, and used for the axially movable accommodation and guidance of a preferably cylindrical guide section of the receptacle.

The receptacle is used to accommodate, hold or clamp a tool. This can be done directly, e.g., by means of an expansion or shrink mechanism, or indirectly, e.g., by means of a collet chuck or quick-change holder. To this end, the side of the receptacle facing away from the guide section exhibits a correspondingly designed receiving section. However, as already mentioned above, the tool to be held by the tool mount can also involve one or more replaceable or disposable cutting inserts, for example. In this case, the receiving section of the receptacle has one or more matching cutting insert seats.

According to the invention, the receptacle in the base body is anchored by way of an axial opening, e.g., an axial through borehole, in the anchor, which passes through the radial dividing wall and can be accessed and actuated for adjusting the spring preload between the base body and receptacle via the recess in the shank section of the base body open on the machine tool side. As opposed to the prior art discussed at the outset, the tool mount according to the invention is hence already characterized by the fact that the spring preload between the base body and receptacle can be individually set to reflect the respective operating conditions and requirements by adjusting the anchor. The adjustment is easy to make, since the anchor can be accessed and actuated via the recess in the shank section of the base body open on the machine tool side. A factory setting of the spring preload can thus be readily corrected afterwards, without the tool mount having to first be disassembled for this purpose. Therefore, the tool mount according to the invention makes it possible to correct the spring preload in a state where a tool has already been clamped into the tool mount. For this reason, the spring preload, i.e., the force/path characteristic or spring travel of a spring load-inducing spring arrangement arranged between the base body and receptacle, can be individually adjusted.

In a preferred embodiment of the tool mount according to the invention, the anchor exhibits an anchor shank that lengthens the guide section and passes through the axial opening in the radial dividing wall, as well as an anchor head that is provided on the anchor shank and supported against the base body. The anchor can here be supported either indirectly, e.g., via a spring element adjacent to the radial dividing wall, or directly in the base body. Because the anchor shank passes through the axial opening in the radial dividing wall of the base body, the anchor head is always situated in the recess in the shank section of the base body that can be accessed on the machine tool side. With respect to the ability to actuate the anchor for setting the spring preload, the tool mount according to the invention offers various options that are always relatively easy to realize, which enable a more compact and robust solution or a more flexible solution that provides the user more possible ways of setting the spring preload and anchoring the receptacle in the base body, depending on the individual needs.

The spring preload is especially easy to set when the anchor as a whole, i.e., anchor shank and anchor head included, is arranged on the receptacle so as to be axially displaceable relative thereto. The anchor head can here be immovably fixed to the anchor shank, e.g., be designed as a single piece with the anchor shank, or be situated on the anchor shank so that it can be axially displaced relative thereto.

For example, in a one-piece embodiment, the anchor can be formed by a cap screw tightened into an axial threaded hole of the guide section, wherein the screw head (anchor head) located in the recess in the shank section of the base body forms a stop, which axially supports the anchor indirectly or directly in the base body. The screw head can be designed as a hexagon or square head with a polygonal outer contour at its machine tool-side end, or as a cylinder head, countersunk head, cheese head, round head, pan head, hook head or hammer head with an engagement opening that can be accessed on the machine tool side at its machine tool-side end, e.g., hexagon socket, recess, cross recess, to engage a matching tool wrench.

Alternatively, the anchor shank and anchor head can be designed separately. For example, the anchor shank can take the form of a threaded bolt, which is screwed into an axial threaded hole of the guide section as a cap screw, similarly to the one-piece design of the anchor described above. The threaded bolt can, but does not have to, have a continuous male thread over its entire length. Similarly to the cap screw described above, the machine tool-side face of the threaded bolt can exhibit an engagement opening accessible on the machine tool side for an actuating tool, e.g., a hexagon socket, recess or cross recess, to enable bolting with the receptacle. The anchor head can consist of a cap screw tightened into an axial threaded hole of the threaded bolt, or of an anchor nut screwed onto a male thread section of the threaded bolt. The anchor nut can be designed as a bolt nut with a polygonal outer contour (hexagon, square, etc.), or as a slotted nut or capstan nut with a cylindrical outer contour and grooves, holes or the like accessible on the machine tool side for engaging an actuating tool.

If the anchor shank has been accommodated in the axial opening of the radial dividing wall of the base body with a defined tight clearance fit, the receptacle is provided with an axial guide by the guide section accommodated in the guide borehole of the bushing section, as well as by the anchor shank accommodated in the radial opening. The annular gap between the outer circumference of the anchor shank and inner circumference of the axial opening can be sealed fluid-tight with a suitable gasket, e.g., an O-ring gasket.

As indicated above, the detachable connection between the anchor and receptacle makes it possible to flexibly adjust the tool mount to varying needs by using different anchor lengths and shapes.

As an alternative to the embodiment described above, in which the anchor as a whole is situated on the guide section of the receptacle so that it can be axially displaced, the anchor shank can be attached or secured as a single piece to the guide section of the receptacle. In this case, the anchor head is arranged on the anchor shank so that it can be displaced axially thereto. If the anchor shank is attached or secured as a single piece to the guide section of the receptacle, it can be accommodated in the radial opening with a defined clearance fit in an axially movable but torque-proof manner, e.g., through positive locking. This not only yields an additional axial guide for the receptacle, but also entrains the torque between the base body and receptacle. The annular gap between the outer circumference of the anchor shank and inner circumference of the axial opening can be sealed fluid-tight with a suitable gasket, e.g., an O-ring gasket. In this case, the anchor head can be formed by a cap screw tightened into an axial threaded hole of the threaded bolt, or an anchor nut screwed onto a male threaded section of the threaded bolt. The anchor nut can be designed as a bolt nut with a polygonal outer contour (hexagon, square, etc.), or as a slotted nut or capstan nut with a cylindrical outer contour and grooves, holes or the like accessible on the machine tool side for engaging an actuating tool.

Securing or attaching the anchor shank to the receptacle as a single piece enables a particularly compact and structurally simple configuration of the receptacle, and permits a torque transmission between the base body and receptacle.

An axial spring preload can be realized between the base body and receptacle by means of a spring element functionally arranged between the receptacle and radial dividing wall, or a [spring element] functionally [arranged] between the radial dividing wall and anchor or anchor head. This yields length compensation with respect to either compressive or tensile stress for the receptacle or a tool clamped into the tool mount. In order to achieve length compensation for both compressive and tensile stress, the spring preload between the base body and receptacle is preferably induced by two axially elastic spring elements, which are situated between the receptacle and radial dividing wall on the one hand, and between the radial dividing wall and anchor or anchor head on the other. The spring element(s) is/are preferably designed as a spring packet each consisting of one or more springs.

Preferably selected as the springs are helical springs, in particular pressure screw springs and/or plate springs, each made out of a metal and/or polymer material, as well as elastomer springs (rubber springs), along with combinations of the different spring types and spring materials. The spring types and/or spring materials can basically be suitably combined to optimally tailor the resultant spring preloads to the respective requirements. The two spring elements can here exhibit an identical structure, i.e., coincide in terms of spring type and spring material, i.e., have the same spring characteristic, or differ, i.e., exhibit different spring characteristics.

Different spring characteristics can make sense in particular for generating threads. For example, the spring element situated between the radial dividing wall in the base body and the receptacle, which conveys the axial feed force from the base body to the receptacle, can be harder than the spring element located between the radial dividing wall in the base body and the anchor or anchor head. By placing a spring element with a high hardness between the receptacle and the radial dividing wall in the base body, the axial feed force exerted on the base body by the machine tool spindle can be conveyed to the receptacle as instantaneously as possible, which can facilitate thread cutting in the thread generating process. As mentioned at the outset, essentially only the rotational movement of the machine spindle is still conveyed to the thread-generating tool once the thread has been cut, since the thread-generating tool is then automatically drawn into the tapping drill hole via the cut thread. Therefore, the spring element arranged between the radial dividing wall in the base body and the anchor or anchor head can be softer in design, since it no longer has to transmit any feed force.

However, depending on the specific application of the tool mount according to the invention, the spring element situated between the radial dividing wall in the base body and the receptacle can also be softer in design than the spring element arranged between the radial dividing wall in the base body and the anchor or anchor head.

The spring elements are preferably designed as plate springs. By comparison to helical springs, the advantage to plate springs is that they can exert very high forces given a very small installation space, and have a long service life. The ability to combine the plate springs made out of metal and/or polymer material in virtually any way desired in conjunction with a suitable configuration (parallel and/or series connection) makes it possible overall to realize a spring preload with a linear, degressive or even progressive spring characteristic.

A positive and/or non-positive connection between the axially opposing faces of the base body and receptacle results in (potentially an additional) torque-proof connection between the base body and receptacle for torque transmission. The non-positive and/or positive connection between the opposing faces of the base body and receptacle allows a torque transmission or torque entrainment for a larger diameter than in the prior art discussed at the outset, since the two face surfaces lie radially outside the diameter of the guide section when viewed axially. For this reason, the torque entrainment takes place over a greater diameter than in the prior art discussed at the outset. Higher torques can thus be transmitted according to the invention. In addition to the above, the torque entrainment is spatially separated from the axially elastic preload, the advantage to which is that torque entrainment can be made independent of the axially elastic preload.

For example, a positive and/or non-positive torque entrainment between the opposing faces of the base body and receptacle can be realized by means of at least one entrainer, in particular a cylindrical entrainer pin, which axially projects from the face of one of the two bodies (base body and receptacle), and movably engages axially into an opposing engagement opening, in particular engagement borehole, on the other body. As mentioned above, the at least one entrainer is spaced a relatively large distance away from the rotational axis of the base receptacle, thereby yielding a high torque transmission capacity. The positive and/or non-positive torque entrainment preferably takes place by means of two entrainers diametrically situated in relation to the rotational axis of the tool mount.

In addition, the base body and receptacle are preferably not rigid in the rotational or torsional direction, but rather linked with each other via a torsion attenuator. A torsion-attenuated torque entrainment enables a smoother operation for the tool held in the tool mount than would be possible without a torsion attenuator. For example, torsion-attenuated torque entrainment becomes especially simple to achieve when the at least one entrainer engages into a fitting sleeve that consists of an elastic polymer material and has been fitted into the engagement opening on the other body. Similarly thereto, the at least one entrainer on the one body from which it axially projects can be arranged in a fitting sleeve that consists of an elastic polymer material and rests in a locating opening, in particular a locating hole. During a torsion-attenuated torque entrainment that permits a tightly restricted twisting between the base body and receptacle, the anchor shank, if it is to be positively accommodated in the axial opening in the radial dividing wall in the base body, must be afforded the play in a rotational direction that is required for the tightly restricted twisting of the receptacle relative to the base body, e.g., the positive fit between the outer contour of the anchor shank and inner contour of the axial opening must correspondingly generously dimensioned.

In addition, the tool mount according to the invention preferably has an inner lubricating coolant channel system that runs along the rotational axis, i.e., centrally, through the collet chuck in order to feed a lubricating coolant supplied on the machine tool side to a tool accommodated in the receptacle. To this end, the tool mount according to the invention can exhibit a lubricating coolant transfer unit, for example a known MQL (minimum quantity lubrication) lubricating coolant transfer unit, with a lubricating coolant transfer tube guided through an axial through borehole in the anchor. The tool-side end section of the lubricating coolant transfer tube is preferably situated in an axially movable manner in a central borehole of an adjusting screw that defines the axial position of a tool clamped in the receptacle, and transfers the lubricating coolant to the tool. The annular gap between the outer circumference of the lubricating coolant transfer tube and the inner circumference of the central borehole of the axial adjusting screw is preferably sealed by an O-ring gasket situated in an annular groove of the axial adjusting screw on the inner circumference side.

The machine tool-side end section of the lubricating coolant transfer tube can be rotationally and axially held, e.g., pressed in, by means of a locking element, e.g., a threaded coupling, which overlaps the anchor on the machine tool side. The locking element prevents dirt particles from penetrating in the direction of the spring element (s) by way of a lateral annular gap between the outer circumference of the anchor head and inner circumference of the recess in the shank section of the base body, thereby ensuring the proper functioning of the elastic preload. In addition, the locking element can establish an interface for connection to a lubricating coolant feed site provided on the machine tool side, since its axial position in the base body can be set independently of the position of the anchor or axial adjusting screw.

To this end, the locking element can be screwed into a threaded hole that empties into the recess in the shank section of the base body. In addition, the locking element can exhibit a tube projection on the tool side, which sits in the machine tool-side end section of the lubricating coolant transfer tube and engages into the through borehole of the anchor with a defined lateral play, so that the anchor can radially center and secure the lubricating coolant transfer tube.

In a preferred further development, the face of the bushing section of the base body facing the receptacle further exhibits an axial annular projection that runs on the outer circumference, which envelops a cylindrical projection of the face of the receptacle facing the base body with a defined lateral play. An O-ring gasket can further be situated on a front-end annular stage of the receptacle defined by the cylindrical projection, and axially support the annular projection of the bushing section of the base body. As a result, the O-ring gasket is situated between an annular surface enveloping the cylindrical projection of the receptacle and the receptacle-facing annular surface of the annular projection of the bushing section of the base body. The O-ring gasket establishes a seal for the axial distance between the base body and receptacle required for length compensation. In addition, the O-ring gasket yields an axial attenuation between the base body and receptacle that is spatially separated from the torsional attenuation described above.

If the axial depth of engagement by the cylindrical projection of the receptacle into the annular projection of the base body is also greater than or equal to the maximum possible length compensation between the receptacle and base body, a further axial guidance of the receptacle relative to the base body can be achieved in addition to the axial guidance via the guide section of the receptacle incorporated in the guide borehole of the bushing section, due to the cylindrical projection of the receptacle accommodated in the annular projection of the base body with a defined lateral play. In the preferred further development, the receptacle can therefore be subjected to repeated, axially spaced axial guidance at varying diameters on or in the base body, thereby yielding a high true running accuracy for the receptacle, and hence for a tool held in the receptacle.

The tool mount according to the invention will be described in more detail below based on two embodiments and various modifications of the embodiments.

FIRST EMBODIMENT

Figure 1:
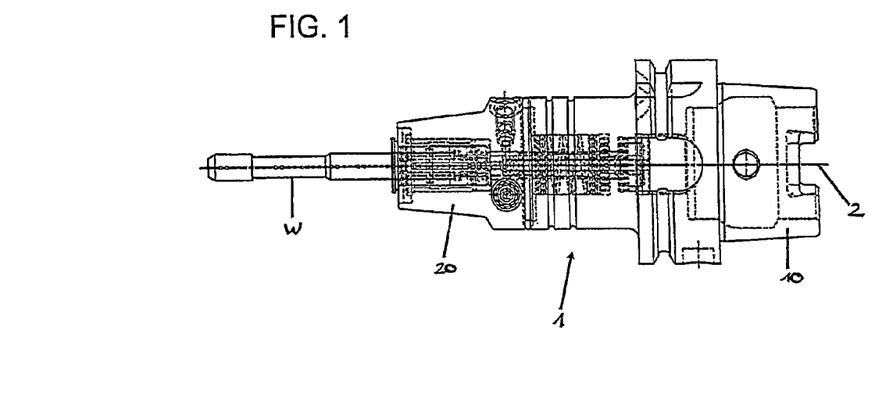
FIG. 1 shows a side view of a first embodiment of a tool mount 1 according to the invention.
Figure 2:
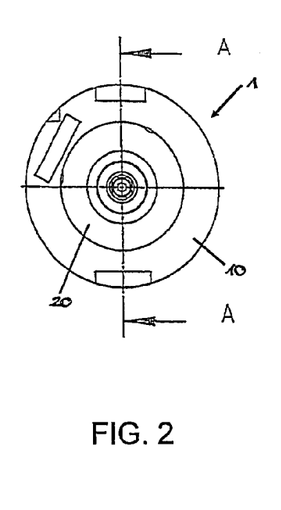
FIG. 2 shows a frontal view of the first embodiment.
Figure 3:
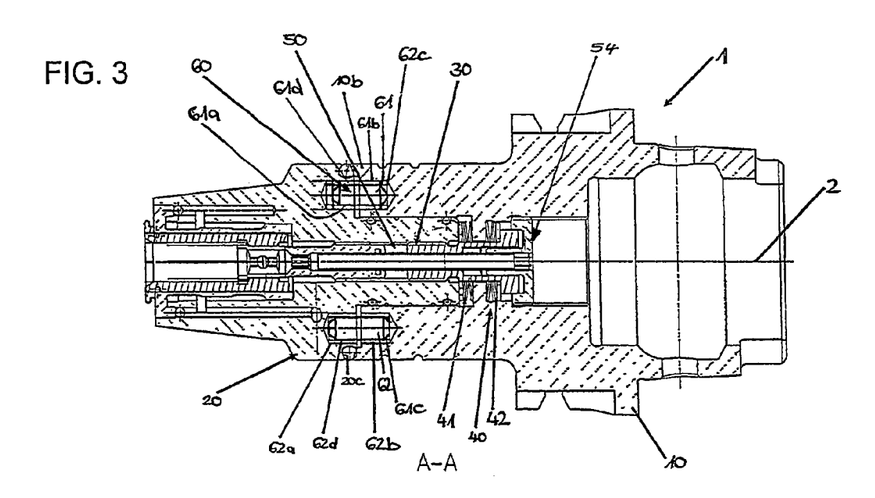
FIG. 3 shows an axial longitudinal section of the first embodiment on a magnified scale.
Figure 4:
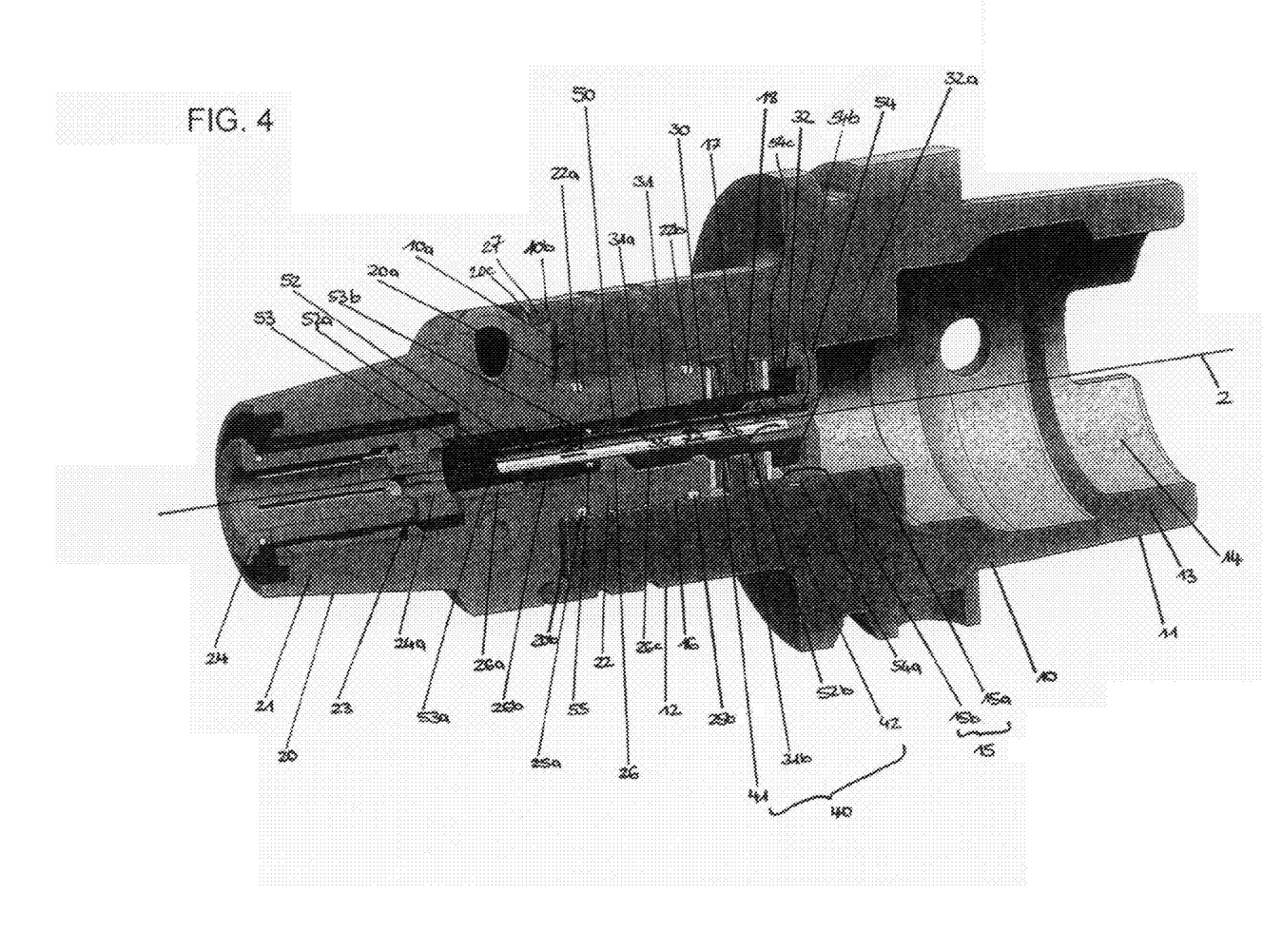
FIG. 4 shows an axial longitudinal section of the first embodiment in a perspective view.

FIGS. 1 to 4 show a first embodiment of a tool mount 1 according to the invention. FIG. 1 shows a side view, FIG. 2 a frontal view, and FIG. 3 an axial longitudinal section of the tool mount 1. FIG. 4 shows an axial longitudinal section of the first embodiment in a perspective view.

In terms of structure and function, the tool mount 1 corresponds to a hydraulic expansion chuck known in the art. However, it has a two-part structure that is comprised of a base body 10 and receptacle 20, and may be gleaned in detail from FIG. 3 and FIG. 4. The base body 10 and receptacle 20 are joined with each other in a torsionally elastic manner for torque transmission by way of a torque entrainment device 60, and in an axially elastic manner for axial length compensation by way of a spring arrangement 40. The tool mount 1 further exhibits a centrally arranged lubricating coolant transfer unit 50 extending along the rotational axis 2.

The base body 10 is functionally divided into a shank section 11 and a bushing section 12, which extend along the rotational axis 2 of the tool mount 1. The shank section 11 is used for coupling the tool mount 1 to a machine tool spindle (not shown) or a tool module (also not shown) of a modularly designed tool system. To this end, the shank section 11 has a hollow shank taper 13 with an axial interior recess 14 and a central recess in the form of a stepped bore 15 that can be accessed via the interior recess 14 and is open on the machine tool side. In the direction of the receptacle 20 (from right to left on FIG. 3 and FIG. 4), the stepped bore 15 exhibits a threaded hole section 15a that empties into the interior recess 14 of the hollow shank taper 13, as well as a cylindrical hole section 15b with a smaller diameter that adjoins the threaded hole section 15a. The cylindrical hole section 15b incorporates one (42) of two spring elements 41, 42 of the spring arrangement 40. The bushing section 12 that axially lengthens the shank section 11 in the direction of the receptacle 20—exhibits a central guide borehole 16 that is open on the tool side. The guide borehole 16 is separated from the axial recess 15 of the shank section 11 by a radial dividing wall 17. The guide borehole 16 incorporates the other (41) of the two spring elements 41, 42 of the spring arrangement 40. An axial opening in the form of a central through borehole 18 is provided in the dividing wall 17. The guide borehole 16 of the bushing section 12, the through borehole 18 in the radial dividing wall 17, along with the central recess 15 and interior recess 14 of the shank section 11 all extend along the rotational axis 2 of the tool mount 1.

The receptacle 20 is functionally divided into a receiving section 21 and a guide section 22, which extend along the rotational axis 2 of the tool mount 1. The receiving section 21 is used to accommodate and clamp a tool W shown only on FIG. 1, and to this end exhibits a known hydraulic expansion mechanism 23. In the first embodiment, the tool W to be clamped in the hydraulic expansion mechanism 23 is clamped with a positive torque entrainment between the tool shank and reducing bushing 24. For this purpose, the reducing bushing 24 has a female square contour 24a on its inner end for positively accommodating a male square section at the shank end of the tool shank of the tool W. As an alternative thereto, the tool to be clamped can be directly clamped without the reducing bushing 24. The cylindrical guide section 22 that lengthens the receiving section 21 in the direction of the base body 10 is accommodated in an axially movable manner in the guide borehole 16 of the base body 10 with a defined lateral play. The annular gap between the outer circumference of the guide section 22 of the receptacle 20 and the inner circumference of the guide borehole 16 of the base body 10 is sealed by two O-ring gaskets 25a, 25b, which are each accommodated in an annular groove 22a, 22b of the guide section 22 on the outer circumference side. A central stepped bore 26 runs through the guide section 22, and exhibits a cylindrical hole section 26a, a threaded hole section 26b with a smaller diameter, and a threaded hole section 26c with a larger diameter in the direction of the base body (viewed from left to right on FIG. 3 and FIG. 4).

According to the invention, the receptacle 20 is anchored in the base body 10 via the anchor 30. The anchor 30 is functionally divided into an anchor shank 31 that extends through the through borehole 18 in the radial dividing wall 17 of the base body 10 and an anchor head 32 situated on the anchor shank 31. In the embodiment, the anchor 30 is designed like a cap screw. The anchor shank 31 is screwed into the larger-diameter threaded hole section 26c of the guide section 22 of the receptacle 20 by way of a male thread provided on its tool-side end section 31a, and accommodated with a defined lateral play in the through borehole 18 of the radial dividing wall 17 in an axially and rotationally movable manner by means of a cylindrical middle section 31b. As a result, the anchor 30 provides the receptacle 20 with an additional axial guide in the base body 10. The anchor head 32 has a cylindrical outer circumference 32a, and forms a stop for the spring element 42. The anchor shank 31 and anchor head 32 are designed as a single piece in the embodiment. Therefore, the anchor 30 is bolted to the receptacle 20 so that it can be displaced axially relative thereto. An axial through borehole in the form of a stepped bore 33 runs through the anchor 30. The stepped bore 33 exhibits a hole section 33a with a larger diameter, a hexagon socket section 33b and a hole section 33c with a smaller diameter in the direction of the receptacle 20 (viewed from right to left on FIG. 3 and FIG. 4). A matching tool wrench can be introduced into the hexagon socket section 33b on FIG. 3 and FIG. 4 from the right via the interior recess 14 in the hollow shank taper 13, the recess 15 in the shank section 11 of the base body 10, and the larger-diameter hole section 33a of the stepped bore 33 in the anchor 30, so as to axially adjust the anchor 30 via bolting in the base body 10.

As already mentioned, the spring arrangement 40 that generates the spring preload between the base body 10 and receptacle 20 is realized by the two spring elements 41, 42, wherein the spring element 41 is situated between the machine tool-side face of the guide section 22 of the receptacle 20 and the tool-side face of the radial dividing wall 17 of the base body 10, and the spring element 42 is located between the machine tool-side face of the radial dividing wall 17 and the tool-side face of the anchor head 32 of the anchor 30. The two spring elements 41, 42 are each designed as a spring packet comprised of several plate springs made out of metal and/or polymer material, and have the same spring characteristics. In particular, FIG. 3 and FIG. 4 show that the spring packets are each composed of three plate springs, which are connected in series as a whole, but with two of the three plate springs being connected in parallel. The anchor shank 31 extends centrally through the two spring elements 41, 42. The two spring elements 41, 42 provide for a small axial distance between the base body 10 and receptacle 20 that is required for axial length compensation, and enable length compensation in both the compressive and tensile directions along the rotational axis 2 of the tool mount 1. Bolting the anchor 30 relative to the receptacle 20 brings about a synchronous change in the spring preload or spring travel of the two spring elements 41, 42. As mentioned above, the anchor 30 is actuated by means of a suitable tool wrench via the interior recess 14 of the hollow shank taper 13 and the central recess 15 of the shank section 11 adjacent thereto in order to set the spring preload of the spring arrangement 40.

The axially opposing faces 10a, 20a of the base body 10 and receptacle 20 are positively and non-positively joined together in the rotational direction for transmitting the torque between the base body 10 and receptacle 20. The positive and non-positive connection between the opposing faces 10a, 20b of the base body 10 and receptacle 20 is realized by two diametrically arranged cylindrical entrainer pins 61, 62, which axially project from the face 10a of the base body and engage into opposing engagement boreholes 61a, 62a (engagement openings) on the receptacle 20 in an axially movable manner. The two entrainer pins 61, 62 are each arranged over a fitting sleeve 61c, 62c that is made out of an elastic polymer material and rests in an axial receiving borehole 61b, 61c (receiving opening) on the base body 10, and each engage in an axially movable manner into a fitting sleeve 61d, 62d that is made out of an elastic polymer material and inserted into the allocated engagement borehole 61a, 62a on the receptacle 20. Therefore, the base body 10 and receptacle 20 are not rigidly connected with each other in a rotational or torsional direction, but rather joined together in a torsion-attenuated and rotationally elastic manner due to the elastic fitting sleeves 61c, 62c, 61d, 62d. As shown on FIG. 3 and FIG. 4, the positive and non-positive connection between the base body 10 and receptacle 20 realized by the entrainer pins 61, 62 is established radially outside of the guide section 22 of the receptacle 20 when viewed axially, making it possible to transmit a high torque.

As further evident from FIG. 3 and FIG. 4, the face 10a of the bushing section 12 of the base body 10 has an annular projection 10b that runs around the outer circumference and envelops a cylindrical projection 20b of the face 20a of the receptacle 20 with a defined lateral play. An O-ring gasket 27 rests on the outer circumference of the cylindrical projection 20b of the receptacle 20a. As a consequence, the O-ring gasket 27 is situated between the annular surface 20c that envelops the cylindrical projection 20b of the receptacle 20 and faces the base body and the face of the annular projection 10b of the bushing section 12 of the base body 10 that faces the receptacle 20. The O-ring gasket 27 produces a seal for the axial gap between the base body 10 and receptacle 20, which is necessary for length compensation and ensured by the spring preload, and provides for an axial attenuation between the receptacle 20 and base body 10. In addition to the axial guidance by the guide section 22 of the receptacle 20 accommodated in the guide borehole 16 of the bushing section 12, the axial engagement by the cylindrical projection 20b of the receptacle 20 into the annular projection 10b of the bushing section 12 of the base body 10 yields a further, if only slight, axial guidance of the receptacle 20 relative to the base body 10.

The tool mount 1 shown on FIG. 1 to FIG. 4 also has an MQL (minimum quantity lubrication) lubricating coolant transfer unit 50, which runs along the rotational axis 2 centrally through the tool mount 1, and defines a central lubricating coolant channel 51 for feeding a lubricating coolant supplied on the machine tool side to a tool W accommodated in the receptacle 20. The lubricating coolant transfer unit exhibits a lubricating coolant transfer tube 52 that penetrates through the stepped bore 33 of the anchor 30, an axial adjusting screw 53 screwed into the smaller-diameter threaded hole section 26b of the guide section 22 accessible on the tool side, as well as a locking element (threaded coupling) screwed into the threaded hole section 15a of the recess 15 of the base body 10 accessible from the machine tool side. The tool-side end section 52a of the lubricating coolant transfer tube 52 is accommodated in an axially movable manner in an axial through borehole 53a of the axial adjusting screw 53 with a defined lateral play. The lateral play between the outer circumference of the lubricating coolant transfer tube 52 and the inner circumference of the axial adjusting screw 53 is sealed by an O-ring gasket 55, which is arranged in an annular groove 53b of the axial adjusting screw 53 located on the inner circumference side. The lubricating coolant transfer tube further extends through the stepped borehole 33 penetrating through the anchor 30, and its machine tool-side end section 52b is pressed fluid-tight into through borehole 54b of the locking element 54 overlapping the anchor 30 on the machine tool side, i.e., connected with the locking element 54 in a torque-proof and axially rigid manner. The outer circumference of the locking element 54 exhibits a male thread 54a, which is screwed into the threaded hole section 15a of the stepped bore 15 of the shank section 11 of the base body 10. The locking element prevents dirt particles from penetrating in the direction of the two spring elements 41, 42 of the spring arrangement 40 via the lateral gap between the anchor 30 and base body 10. In addition, the locking element 54, whose axial position in the base body 10 does not depend on the location of the anchor 30 or axial adjusting screw 53, forms an interface for connecting the lubricating coolant transfer unit 50 to a lubricating coolant feed site provided on the machine tool side (not shown).

As shown by FIG. 1, the locking element 54 exhibits a tube projection 54c on the tool side that engages into the enlarged-diameter bore section 33a of the stepped bore 33 of the anchor 30, thereby additionally centering and securing the anchor 30. Twisting the locking element 54 causes the lubricating coolant transfer tube 52 to be axially adjusted relative to the axial adjusting screw 53 or to the anchor 30.

SECOND EMBODIMENT

Figure 5:
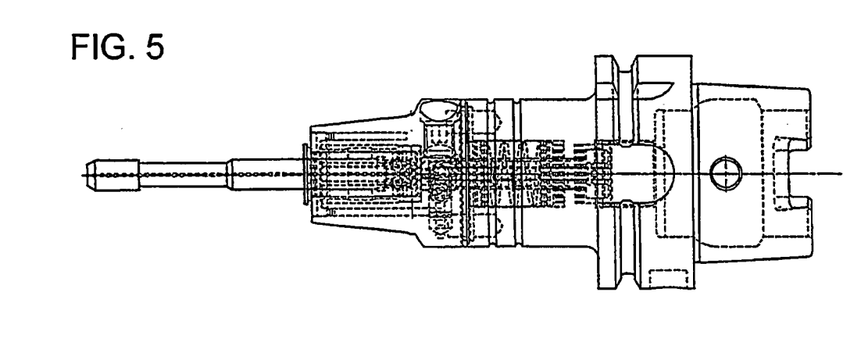
FIG. 5 shows a second embodiment of a tool mount according to the invention.
Figure 6:
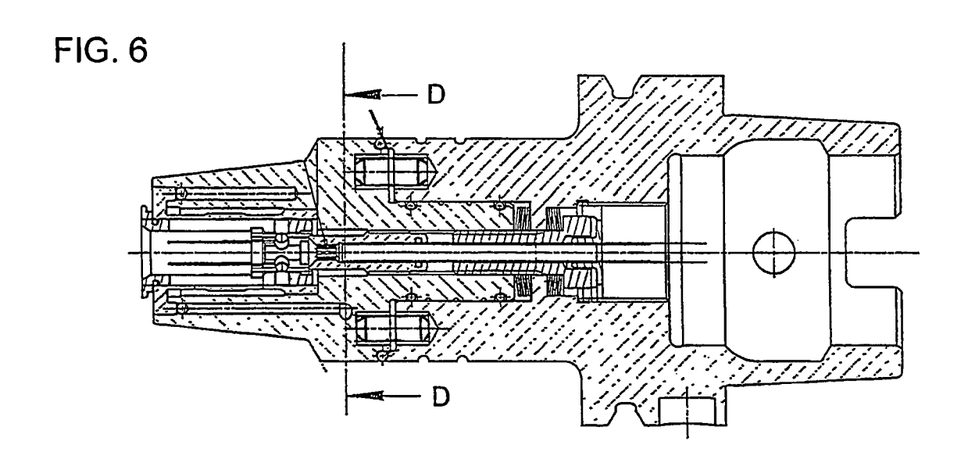
FIG. 6 shows an axial longitudinal section of the second embodiment on a magnified scale.
Figure 7:
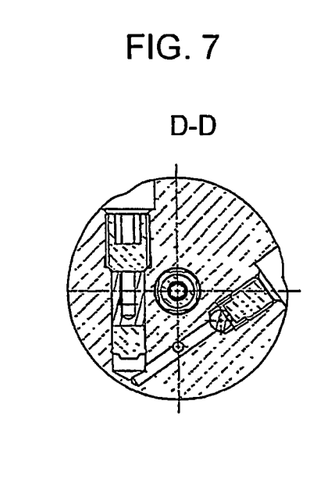
FIG. 7 shows a cross section of the second embodiment at location D-D.

FIGS. 5 to 7 show a second embodiment for a tool mount 1 according to the invention. FIG. 5 shows a side view, while FIG. 6 and FIG. 7 show an axial longitudinal section or a cross section of the tool mount 1.

The second embodiment essentially only differs from the first embodiment with respect to the spring arrangement 40 that generates the spring preload between the base body 10 and receptacle 20. In the second embodiment, the two spring elements 41, 42 are configured as a spring packet consisting of three parallel connected plate springs made out of metal and/or polymer material, as evident from FIG. 6.

(Modifications)

Various modifications to the embodiments described above will be explained below, and can be applied selectively or in any combination to any of the two embodiments described above within the limits of what is technically feasible.

In the embodiments described above, the anchor, for axial adjustment purposes, has a hexagon socket section for engagement by a matching tool wrench, and the anchor head has a cylindrical outer circumference. As an alternative thereto, the anchor can be axially adjusted via an anchor head. To this end, the anchor head can exhibit a hexagon head contour, just like a conventional cap screw.

In the embodiments described above, the anchor is designed as a single piece, and thus arranged as a whole on the receptacle so as to be adjustable thereto. As an alternative to the above, the anchor shank and anchor head can be separately designed, wherein the anchor head is arranged on the anchor shank in an axially adjustable manner.

For example, the anchor shank can be formed by a threaded bolt, which is screwed into an axial threaded hole of the guide section as a cap screw, similarly to the one-piece configuration described above. The threaded bolt can, but does not have to, have a continuous male thread over its entire length. Similarly to the cap screw described above, the machine tool-side face of the threaded bolt can exhibit an engagement opening accessible on the machine tool side for an actuating tool, e.g., a hexagon socket, recess or cross recess, to enable bolting with the receptacle.

In addition, the anchor shank can be secured or attached as a single piece to the guide section of the receptacle.

If the anchor head is adjustably arranged on the anchor shank, the anchor shank rigidly connected with the guide section of the receptacle can be accommodated in the radial opening with a defined clearance fit in a torque-proof manner, e.g., through positive locking between its outer contour and the inner contour of the axial opening. The torque-proof arrangement not only yields an additional axial guide for the receptacle, but entrains the torque between the base body and receptacle.

The anchor head can consist of a cap screw tightened into an axial threaded hole of the threaded bolt, or of an anchor nut screwed onto a male thread section of the threaded bolt. The anchor nut can be designed as a bolt nut with a polygonal outer contour (hexagon, square, etc.), or as a slotted nut or capstan nut with a cylindrical outer contour and grooves, holes or the like accessible on the machine tool side for engaging an actuating tool.

In the embodiments described above, the spring elements are each designed as spring packets consisting of three plate springs. As an alternative to plate springs, use can also be made of one or more helical springs, in particular pressure screw springs, elastomer springs (rubber springs), as well as combinations thereof and/or with plate springs. Various spring elements and/or materials can basically be suitably combined to optimally tailor the resultant spring preloads to the respective requirements.

In contrast to the embodiments described above, the two spring elements can have different spring characteristics.

For example, the spring element situated between the radial dividing wall in the base body and the receptacle, which conveys the axial feed force from the base body to the receptacle, can be harder than the spring element located between the radial dividing wall in the base body and the anchor or anchor head. By placing a spring element with a high hardness between the receptacle and the radial dividing wall in the base body, the axial feed force exerted on the base body by the machine tool spindle can be conveyed to the receptacle as instantaneously as possible, which can facilitate thread cutting in the thread generating process. Essentially only the rotational movement of the machine spindle is still conveyed to the thread-generating tool once the thread has been reliably cut, since the thread-generating tool is then automatically drawn into the tapping drill hole via the cut thread. Therefore, the spring element arranged between the radial dividing wall in the base body and the anchor or anchor head can be softer in design, since it does not transmit any feed force.

However, depending on the specific application of the tool mount according to the invention, the spring element situated between the radial dividing wall in the base body and the receptacle can also be softer in design than the spring element arranged between the radial dividing wall in the base body and the anchor or anchor head.

In contrast to the embodiments described above, in which the two faces of the base body and receptacle are joined together in the rotational direction in a positive and non-positive manner by means of entrainer pins inserted into elastic fitting sleeves, the entrainer(s) can also have another shape, for example a polygonal outer contour, or the like.

REFERENCE LIST

1 Tool mount
2 Rotational axis
10 Base body
10a Face
10b Annular projection
11 Shank section
12 Bushing section
13 Hollow shank taper
14 Interior recess
15 Stepped bore
15a Threaded hole section
15b Hole section
16 Guide borehole
17 Dividing wall
15 Recess
18 Through borehole
Receptacle
20a Face
20b Cylindrical projection
20c Annular stage
21 Receiving section
22 Guide section
22a Annular groove
22b Annular groove
23 Hydraulic expansion mechanism
24 Reducing bushing
24a Female square contour
25a O-ring gasket
26 Stepped bore
26a Hole section
26b Threaded hole section
26c Threaded hole section
27 O-ring gasket
30 Anchor
31 Anchor shank
32 Anchor head
31a End section
31b Middle section
32a Hexagon head contour
33 Stepped bore (through borehole)
33a Threaded hole section
33b Hole section
33c Hole section
40 Spring arrangement
41 Spring element
42 Spring element
50 Lubricating coolant transfer unit
51 Lubricating coolant channel
52 Lubricating coolant transfer tube
52a End section
52b End section
53 Adjusting screw
53a Through borehole
53b Annular groove
54 Locking element
54a Male thread
54b Through borehole
54c Tube projection
55 O-ring gasket
60 Torque entrainment device
61 Entrainer pin
62 Entrainer pin
61a Engagement borehole (engagement openings)
62a Engagement borehole (engagement openings)
61b Receiving borehole (receiving opening)
62b Receiving borehole (receiving opening)
61c Fitting sleeve
62c Fitting sleeve
61d Fitting sleeve
62d Fitting sleeve

The invention claimed is:

1. A tool mount comprising:
a base body;
a receptacle; and
at least one entrainer that axially projects from a face of one of the base body and the receptacle and engages into an opposing engagement opening on the other of the base body and the receptacle in an axially movable manner,
the receptacle joined with the base body for torque transmission and anchored in the base body in an axially movable manner with a spring preload,
the base body comprising a shank section and a bushing section,
the shank section having a recess that is open on the machine tool side,
the bushing section axially lengthening the shank section and comprising a guide borehole that is open on the tool side and separated from the recess of the shank section by a radial dividing wall,
the receptacle exhibiting a guide section that is guided in the guide borehole of the bushing section in an axially movable manner,
the receptacle anchored by an anchor that passes through an axial opening in the radial dividing wall and can be actuated for setting the spring preload via the recess of the base body,
opposing faces of the base body and receptacle are connected with each other in a positive and/or non-positive manner for torque transmission,
the at least one entrainer engaging into a fitting sleeve that is made out of an elastic polymer material and inserted into the opposing engagement opening on the other body.

2. A tool mount comprising:
a base body;
a receptacle; and
at least one entrainer that axially projects from a face of one of the base body and the receptacle and engages into an opposing engagement opening on the other of the base body and the receptacle in an axially movable manner,
the receptacle joined with the base body for torque transmission and anchored in the base body in an axially movable manner with a spring preload,
the base body comprising a shank section and a bushing section,
the shank section having a recess that is open on the machine tool side,
the bushing section axially lengthening the shank section and comprising a guide borehole that is open on the tool side and separated from the recess of the shank section by a radial dividing wall,
the receptacle exhibiting a guide section that is guided in the guide borehole of the bushing section in an axially movable manner,
the receptacle anchored by an anchor that passes through an axial opening in the radial dividing wall and can be actuated for setting the spring preload via the recess of the base body,
opposing faces of the base body and receptacle are connected with each other in a positive and/or non-positive manner for torque transmission,
the at least one entrainer secured to the base body or the receptacle by means of a fitting sleeve that is made out of an elastic polymer material and rests in a receiving borehole.

3. A tool mount comprising:
a base body;
a receptacle;
an inner lubricating coolant channel system; and
a lubricating coolant transfer unit,
the receptacle joined with the base body for torque transmission and anchored in the base body in an axially movable manner with a spring preload,
the base body comprising a shank section and a bushing section,
the shank section having a recess that is open on a machine tool side,
the bushing section axially lengthening the shank section and comprising a guide borehole that is open on the machine tool side and separated from the recess of the shank section by a radial dividing wall,
the receptacle exhibiting a guide section that is guided in the guide borehole of the bushing section in an axially movable manner,
the receptacle anchored by an anchor that passes through an axial opening in the radial dividing wall and can be actuated for setting the spring preload via the recess of the base body,
the inner lubricating coolant channel system running through the tool mount for feeding a lubricating coolant supplied on the machine tool side to a tool accommodated in the receptacle,
the lubricating coolant transfer unit comprising a lubricating coolant transfer tube accommodated in an axial through borehole of the anchor,
the lubricating coolant transfer tube comprising a machine tool-side end section which is held by a locking element that overlaps the anchor on the machine tool side.

4. The tool mount according to claim 3, wherein the locking element is screwed into a threaded hole that can be accessed via the recess of the base body.

5. The tool mount according to claim 3, wherein the locking element comprises an axial tube projection on the machine tool side that engages into the through borehole of the anchor.

6. A tool mount comprising:
a base body; and
a receptacle,
the receptacle joined with the base body for torque transmission and anchored in the base body in an axially movable manner with a spring preload,
the base body comprising a shank section and a bushing section,
the shank section having a recess that is open on the machine tool side,
the bushing section axially lengthening the shank section and comprising a guide borehole that is open on the tool side and separated from the recess of the shank section by a radial dividing wall,
the receptacle exhibiting a guide section that is guided in the guide borehole of the bushing section in an axially movable manner, the receptacle anchored by an anchor that passes through an axial opening in the radial dividing wall and can be actuated for setting the spring preload via the recess of the base body,
a face of a bushing section of the base body facing the receptacle comprises an axial annular projection that envelops a cylindrical projection of a face of the receptacle facing the base body with a defined lateral play,
an O-ring gasket arranged on a front-end annular surface of the receptacle defined by the cylindrical projection, the O-ring gasket axially supporting the annular projection of the bushing section of the base body.

7. A tool mount comprising:
a base body;
a receptacle;
an anchor; and
at least first and second spring elements, the base body comprising a shank section, a bushing section and a dividing wall,
the shank section having a shank section recess that is open on a first end of the base body,
the bushing section having a guide borehole that is open on a second end of the base body,
the dividing wall between the shank section recess and the guide borehole, the dividing wall defining a dividing wall opening that extends from the shank section recess to the guide borehole,
the receptacle comprising a guide section and a receiving section, the guide section in the guide borehole, the receptacle slidable relative to the base body along a first axis,
the anchor comprising an anchor shank and an anchor head, the anchor shank comprising anchor shank threads threaded with receptacle threads on the receptacle,
the first spring element between the guide section and the dividing wall,
the second spring element between the anchor head and the dividing wall.

8. A tool mount as recited in claim 7, wherein the anchor comprises an engagement region that is accessible from the first end of the tool mount to turn the anchor relative to the receptacle, thereby causing the anchor to move along the first axis relative to the receptacle and thereby adjusting a spring preload exerted by the first and second spring elements between the base body and the receptacle.

9. A tool mount as recited in claim 7, wherein the base body, the receptacle and the anchor are substantially radially symmetrical relative to the first axis.

10. A tool mount as recited in claim 7, wherein the smallest dimension of the dividing wall opening in a direction perpendicular to the first axis [1] is smaller than the smallest dimension of the shank section recess at a location adjacent to the dividing wall opening and in a direction perpendicular to the first axis, and [2] is smaller than the smallest dimension of the guide borehole at a location adjacent to the dividing wall opening and in a direction perpendicular to the first axis.

11. A tool mount as recited in claim 7, wherein the anchor head comprises anchor head threads threaded onto anchor shank threads on the anchor shank.

12. A tool mount as recited in claim 7, wherein the anchor is a one-piece unitary structure.

13. A tool mount as recited in claim 7, wherein opposing faces of the base body and the receptacle are connected with each other in a positive and/or non-positive manner for torque transmission.

14. A tool mount as recited in claim 7, wherein the tool mount further comprises a torsion attenuator between the base body and receptacle.

15. A tool mount as recited in claim 7, wherein the tool mount further comprises at least one entrainer that comprises a first end and a second end, the first end extending into a first recess in the base body, the second end extending into a first recess in the receptacle.

16. A tool mount as recited in claim 15, wherein the tool mount further comprises at least a first fitting sleeve, the first fitting sleeve comprising elastic polymer material, at least a portion of the first fitting sleeve in the first recess in the base body or the first recess in the receptacle.

17. A tool mount as recited in claim 7, wherein the tool mount further comprises an inner lubricating coolant channel system extending through the tool mount from the shank section recess to the receiving section.

18. A tool mount as recited in claim 7, wherein the tool mount further comprises a lubricating coolant transfer tube extending through an anchor borehole in the anchor.

19. A tool mount as recited in claim 18, wherein the tool mount further comprises a locking element, the locking element rigidly attached to the lubricating coolant transfer tube and comprising locking element threads threaded on base body threads on the base body.

20. A tool mount as recited in claim 7, wherein the bushing section comprises an axial annular projection and the receptacle comprises a receptacle projection, the axial annular projection extending around the receptacle projection.

21. A tool mount as recited in claim 20, wherein the tool mount further comprises at least a first gasket, the first gasket extending around the receptacle projection, the first gasket between the receptacle and the axial annular projection.

22. A tool mount as recited in claim 7, wherein:
the first spring element applies force pushing the guide section away from the dividing wall, and
the second spring element applies force pushing the anchor head away from the dividing wall.

23. A tool mount as recited in claim 22, wherein:
the first spring element is in direct contact with the guide section and in direct contact with a first portion of the dividing wall,
the second spring element is in direct contact with the anchor head and in direct contact with a second portion of the dividing wall.

24. A tool mount comprising:
a base body;
a receptacle; and
at least a first entrainer,
the receptacle anchored in the base body in an axially movable manner with a spring preload for torque transmission,
the base body comprising a shank section and a bushing section and a dividing wall,
the shank section having a shank section recess that is open on a first end of the base body,
the bushing section having a guide borehole that is open on a second end of the base body, the dividing wall between the shank section recess and the guide borehole, the
dividing wall defining a dividing wall opening that extends from the shank section recess to the guide borehole,
the receptacle comprising a guide section and a receiving section, the guide section in the guide borehole, the receptacle slidable relative to the base body along a first axis,
the first entrainer comprising a first end and a second end, the first end extending into a first recess in the base body, the second end extending into a first recess in the receptacle, the first recess in the base body spaced from the first recess in the receptacle in a direction parallel to the first axis.

25. A tool mount as recited in claim 24, wherein the tool mount further comprises at least a first fitting sleeve, the first fitting sleeve comprising elastic polymer material, at least a portion of the first fitting sleeve in the first recess in the base body or the first recess in the receptacle.

26. A tool mount comprising:
   a base body;
   a receptacle;
   an anchor; and
   a lubricating coolant transfer tube,
   the base body comprising a shank section and a bushing section and a dividing wall,
   the shank section having a shank section recess that is open on a first end of the base body,
   the bushing section having a guide borehole that is open on a second end of the base body, the dividing wall between the shank section recess and the guide borehole, the
   dividing wall defining a dividing wall opening that extends from the shank section recess to the guide borehole,
   the receptacle comprising a guide section and a receiving section, the guide section in the guide borehole, the receptacle slidable relative to the base body along a first axis,
   the anchor comprising an anchor shank and an anchor head, the anchor shank comprising anchor shank threads threaded with receptacle threads on the receptacle,
   the lubricating coolant transfer tube extending through an anchor borehole in the anchor,
   the locking element rigidly attached to the lubricating coolant transfer tube and comprising locking element threads threaded on base body threads on the base body.

27. A tool mount comprising:
   a base body;
   a receptacle;
   an anchor;
   a first spring element; and
   a second spring element,
   the base body comprising a shank section and a bushing section and a dividing wall,
   the shank section having a shank section recess that is open on a first end of the base body,
   the bushing section having a guide borehole that is open on a second end of the base body,
   the dividing wall between the shank section recess and the guide borehole, the dividing wall defining a dividing wall opening that extends from the shank section recess to the guide borehole,
   the receptacle comprising a guide section and a receiving section, the guide section in the guide borehole, the receptacle slidable relative to the base body along a first axis,
   the anchor comprising an anchor shank and an anchor head, the anchor shank comprising anchor shank threads threaded with receptacle threads on the receptacle,
   the bushing section comprising an axial annular projection,
   the receptacle comprises a receptacle projection,
   the axial annular projection extending around the receptacle projection,
   the first spring element between the guide section and the dividing wall, the second spring element between the anchor head and the dividing wall.

28. A tool mount as recited in claim 27, wherein the tool mount further comprises at least a first gasket, the first gasket extending around the receptacle projection, the first gasket between the receptacle and the axial annular projection.

* * * * *